Oct. 23, 1962     J. P. TARBOX ETAL     3,059,755

HAY BALER

Filed May 5, 1959     5 Sheets-Sheet 1

INVENTORS:
JOHN P. TARBOX
JAMES H. HOLLYDAY

BY Joseph Allen Brown
ATTORNEY

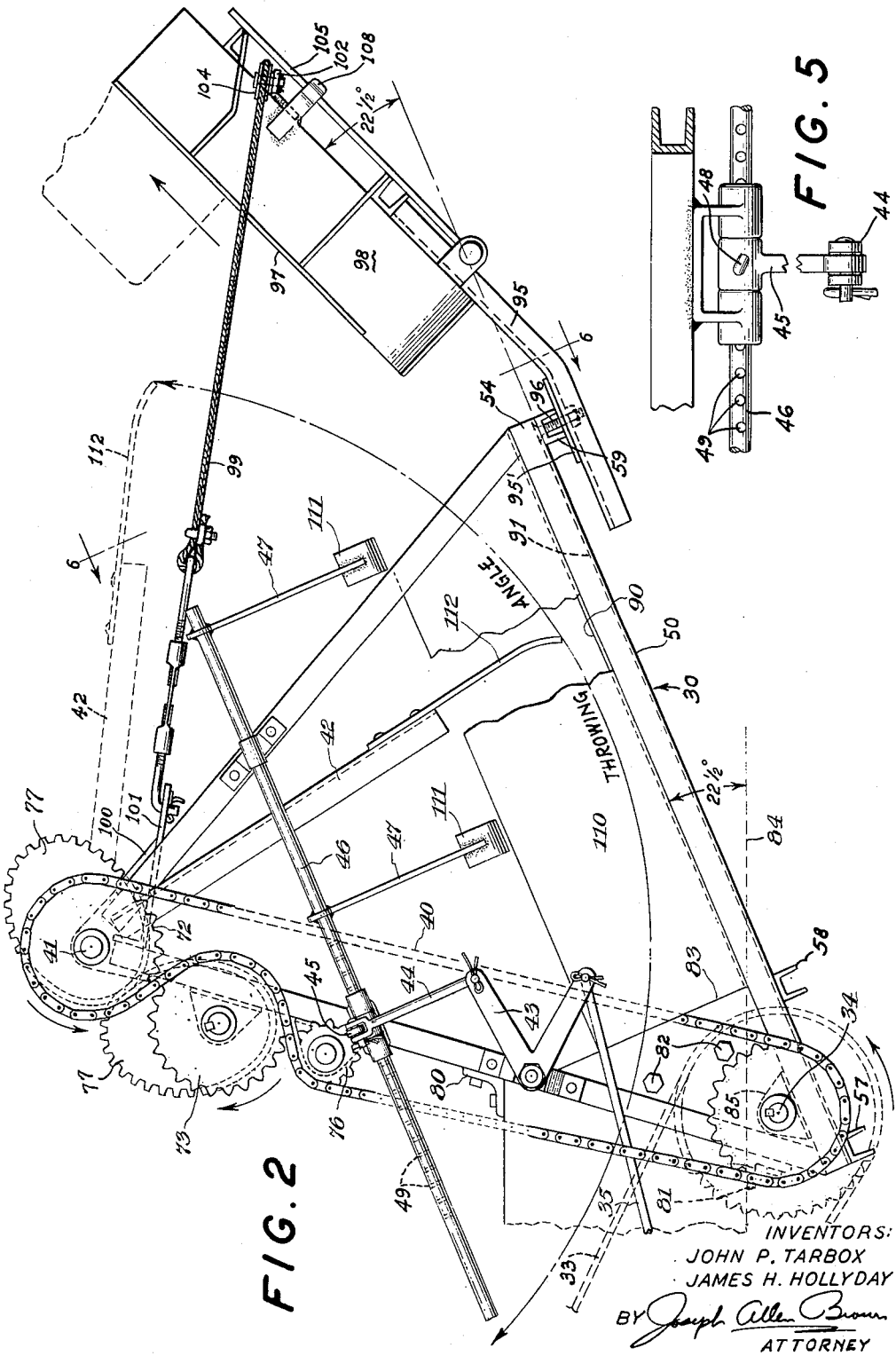

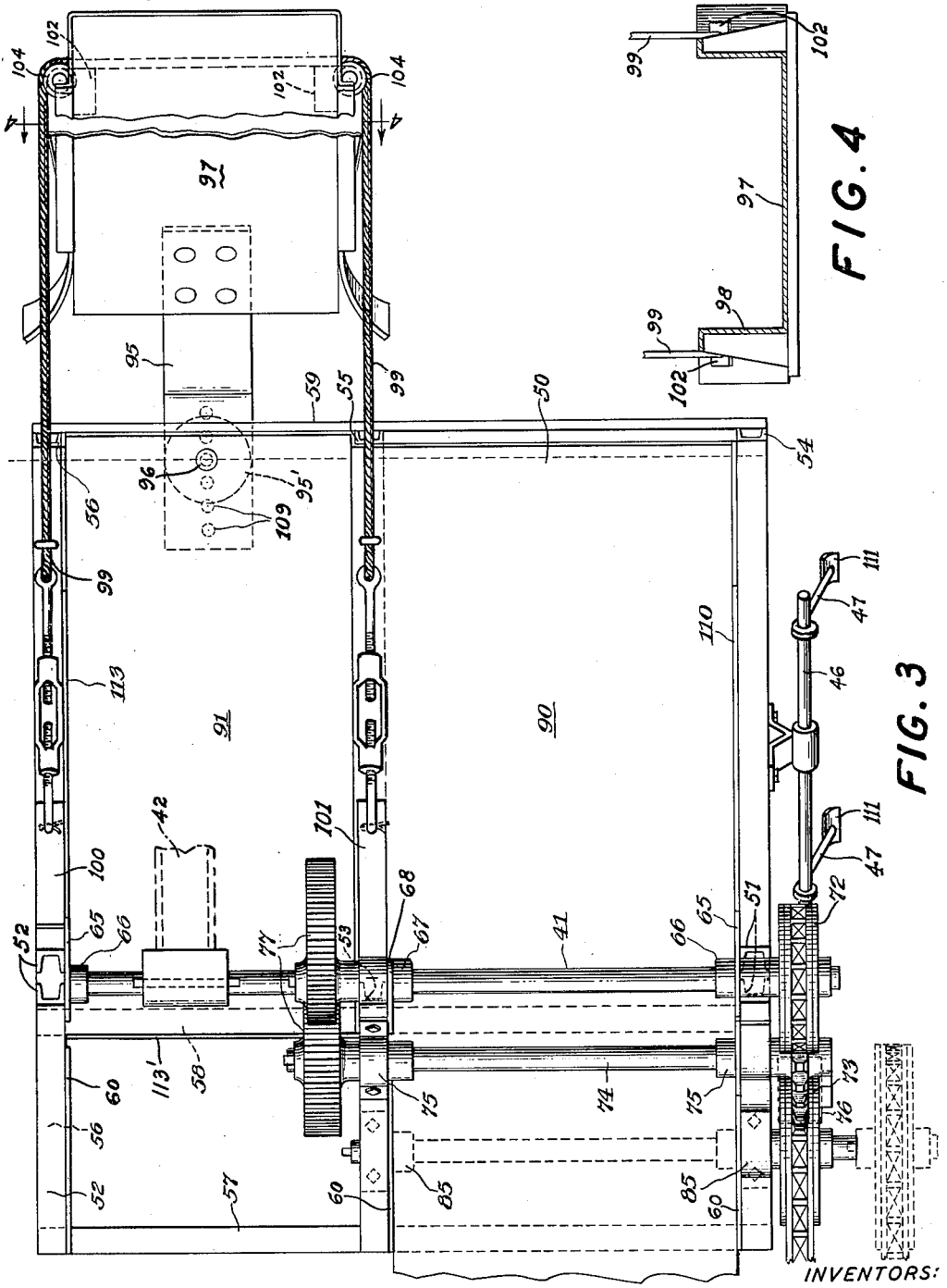

Oct. 23, 1962   J. P. TARBOX ETAL   3,059,755
HAY BALER
Filed May 5, 1959   5 Sheets-Sheet 4

INVENTORS.
JOHN P. TARBOX
JAMES H. HOLLYDAY
BY Joseph Allen Brown
ATTORNEY

United States Patent Office 3,059,755
Patented Oct. 23, 1962

3,059,755
HAY BALER
John P. Tarbox, Philadelphia, and James H. Hollyday, New Holland, Pa., assignors to Sperry Rand Corporation, New Holland, Pa., a corporation of Delaware
Filed May 5, 1959, Ser. No. 811,144
11 Claims. (Cl. 198—128)

This invention is in the field of hay balers and has to do with the handling of bales upon their emergence from the bale case. It is in that class of mechanisms which as combined with the baler receives the bales as they are discharged from the case and trajects them into a following wagon.

One principal object is the attainment of a mechanism which is sturdy and durable, yet so simple that it can be manufactured and sold at low cost, and can be economically operated and maintained.

The outstanding objects of our invention have been attained as above outlined, by devising a new method of bale handling. This method consists in trajecting a bale directly from the traveling hay baler into a wagon following the baler by first moving the bale upon its discharge from the bale case to a position laterally of the region of its discharge and thereafter trajecting it to the following wagon.

Structurally as few parts as possible have been employed, heavy or massive parts have been avoided, and in trajecting the bale there has been employed, in one form of the invention, continuously rotating trajecting members rather than reciprocating members.

General adaptability is also an aim. To this end we have first constructed the bale trajecting mechanism per se as a unitary assemblage of parts which can readily be attached and detached as a unit from any type of baler. Secondly, we use the same power source for trajecting as used for baling, and have arranged the cycle of operation of the bale trajecting mechanism in such timed relationship to the compressing plunger of the baler as to effect the trajection of the bale during the retraction stroke of the plunger. Thereby overloading of the source of power during the compression stroke is avoided and the invention becomes as readily useable in connection with balers carrying their own source of power as in the instance of balers operated from the power-take-off shaft of a tractor, and may be so operated when the baler is operated from low power tractors as readily as when operated from high power tractors.

A yet further object is the avoidance of tearing bales or leaf loss during the handling. This we achieve by handling the bales by pushing upon the side and end of the bale through end or side engaging members of relatively large areas which do not at any time enter the body of the bale and which leave contact with the bale smoothly.

Other objects of this invention will be apparent hereinafter from the specification and from the recital in the appended claims.

In the drawings:

FIG. 1 is a three-quarter perspective taken from the left side at an elevation somewhat above and a little to the rear of a bale trajecting mechanism per se constructed according to this invention. The illustration shows the unitary assemblage of the mechanism as attached to the rear end of a bale case of usual form, and also in its relation to the tongue of the following wagon which is hitched to the baler;

FIG. 2 is a side elevation of the showing in FIG. 1 drawn on a larger scale;

FIG. 3 is a top plan view of FIG. 2;

FIG. 4 is a section of the bale directing chute taken on line 4—4 of FIG. 3 looking in the direction of the arrows;

FIG. 5 is an enlarged detail of a part of the bale side pushing device, showing the adjustment means for varying bale lengths;

Figure 7:
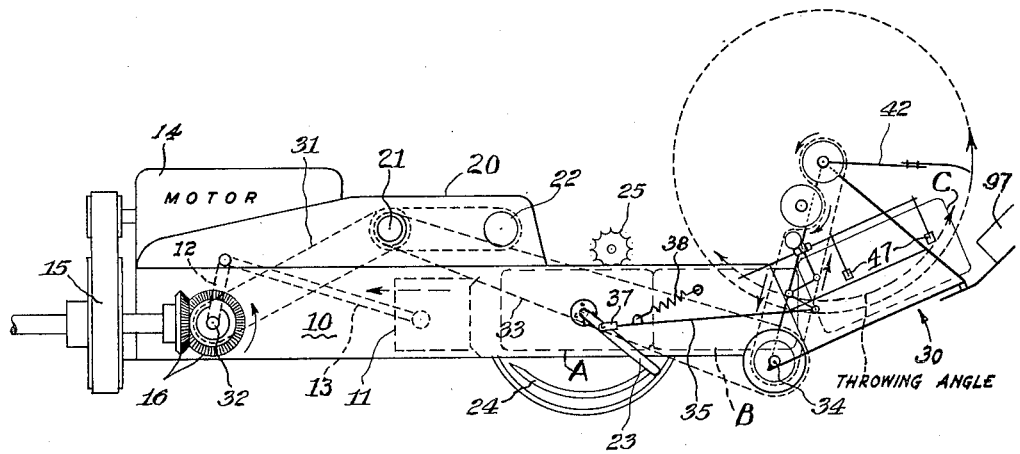
FIG. 7 is a diagrammatic showing in side elevation of the outlines of a bale with bale trajecting mechanism attached, and showing in particular the power connections from the parts of the baler to the parts of the bale trajecting mechanism which they drive.

Referring now to the drawings by numerals of reference and first to FIG. 7, the bale case is designated 10, a plunger within it 11, a crank 12, a connecting rod between the plunger 11 and the crank for driving the plunger 13, a baler driving motor 14, a belt drive from the baler motor 15, and a gear through which the crank is driven 16. The infeed housing of the baler is designated 20, and the shaft which drives the infeed is designated 21. The infeed itself is not shown because it does not enter into the combination of the bale trajecting mechanism and the baler.

A bale tying mechanism is illustrated symbolically at 22 and the needle which it drives through a yoke 23 is designated 24, while a bale length metering wheel which controls the action of the tier is designated 25. The bale trajecting mechanism per se shown attached to the rear end of the bale case is designated generally 30. This mechanism is driven from the baler itself through two power connections. The main such connection is a chain and sprocket connection 31 from crank shaft 32 to the infeed power shaft 21 which in turn transmits power through a chain and sprocket connection 33 from the infeed power shaft 21 to main drive shaft 34 of the bale trajecting mechanism. Connection 33 is a speed reducing connection which drives shaft 34 but one revolution for each two strokes of the plunger 11. The other power connection is a link 35 connecting the bale trajecting mechanism at 37 with the yoke 23 of the tier 22 which drives the needles 24.

Referring now also to FIGS. 1–3 and 7 it will be seen that through chain and sprocket connection 40, main shaft 34 drives transversely extending overhead shaft 41 and through that transversely extending shaft drives in continuous rotation a long trajecting arm 42. A similar inspection would show through the link 35 the needle yoke 23 when it is operated acts through bell crank 43, link 44 and crank 45 to oscillate a shaft 46 extending longitudinally of the left side of the trajecting mechanism 30 and therefore to oscillate a pair of depending arms 47. These shafts and arms constitute the moving parts of the bale trajecting mechanism. They are supported upon a rigid framework through which attachment of the mechanism 30 to the bale case is effected.

This rigid framework is in general comprised of a bale receiving platform 50, and left and right vertical A-frames erected on this platform and numbered respectively 51 and 52, together with an intermediate frame member 53 transversely in the same plane as the forward members of frames 51 and 52. The platform 50 is comprised of longitudinally extending frame members 54, 55 and 56 which are cross connected by transverse frame members 57, 58 and 59. These members are all welded together or otherwise suitably rigidly joined, and the frame members 51, 52 and 53 are in turn welded or otherwise secured at their bottom ends to longitudinally extending members 54, 55 and 56. Longitudinal interbracing between the forward members of the A frames 51, 52 and the companion member 53 and the longitudinal extending members 54, 55, 56 to which they are attached, is provided in the form of gusset plates 60 of triangular form appropriately welded to the inner vertical faces of the members which they brace.

At the top of the branches of A-frames 51 and 52 are joined together by bearing brackets 65 to which they are welded. The bearing brackets in turn support the bearings 66 which form the apices of the A-frames 51, 52 and journal the opposite ends of the driving shaft 41 of the bale moving arm 42. The intermediate member 53 is surmounted by an intermediate bearing 67 which intermediately journals the shaft 41. The bearing is supported by a bracket 68 welded interiorly of the channel cross section of the member 53.

Shaft 41 so journaled is not directly driven by sprocket and chain drive 40, but is indirectly driven through a pair of elliptical gears 77 which are in turn driven directly from the drive 40 through counter shaft 74 and sprocket 73 keyed to the latter. The sprocket 72 on shaft 41 is an idler sprocket journaled but not keyed to that shaft and its chain is passed reversely over sprocket 73 and idler 76 mounted on A-frame 51. This reverses the relation of counter shaft 74 as respects the counterclockwise rotation of main shaft 34 and so in turn imparts to arm 42 the counterclockwise rotation (FIG. 1) requisite to traject bales rearwardly.

The gusset plates 60 associated respectively with the members of A-frame 51 and the member 53 are spaced apart a distance very approximately equal to the distance between the sides of the bale case, that is to say the external width of the bale case, whereby the completely assembled structure just now described can be slipped over the rear end of the bale case 10 of the baler and secured thereon in the proper position to enable it to function to the best advantage. Two means of securement are shown. The one consists of overlying and underlying angular brackets 80 and 81 bolted or welded on the one hand to the forward faces of members 51 and 53 and on the other hand to the top and bottom faces of the bale case. The other securing means comprises bolts 82 passed through the gusset plates 60 into the side of the casing. Either or both may be used.

Figure 1:
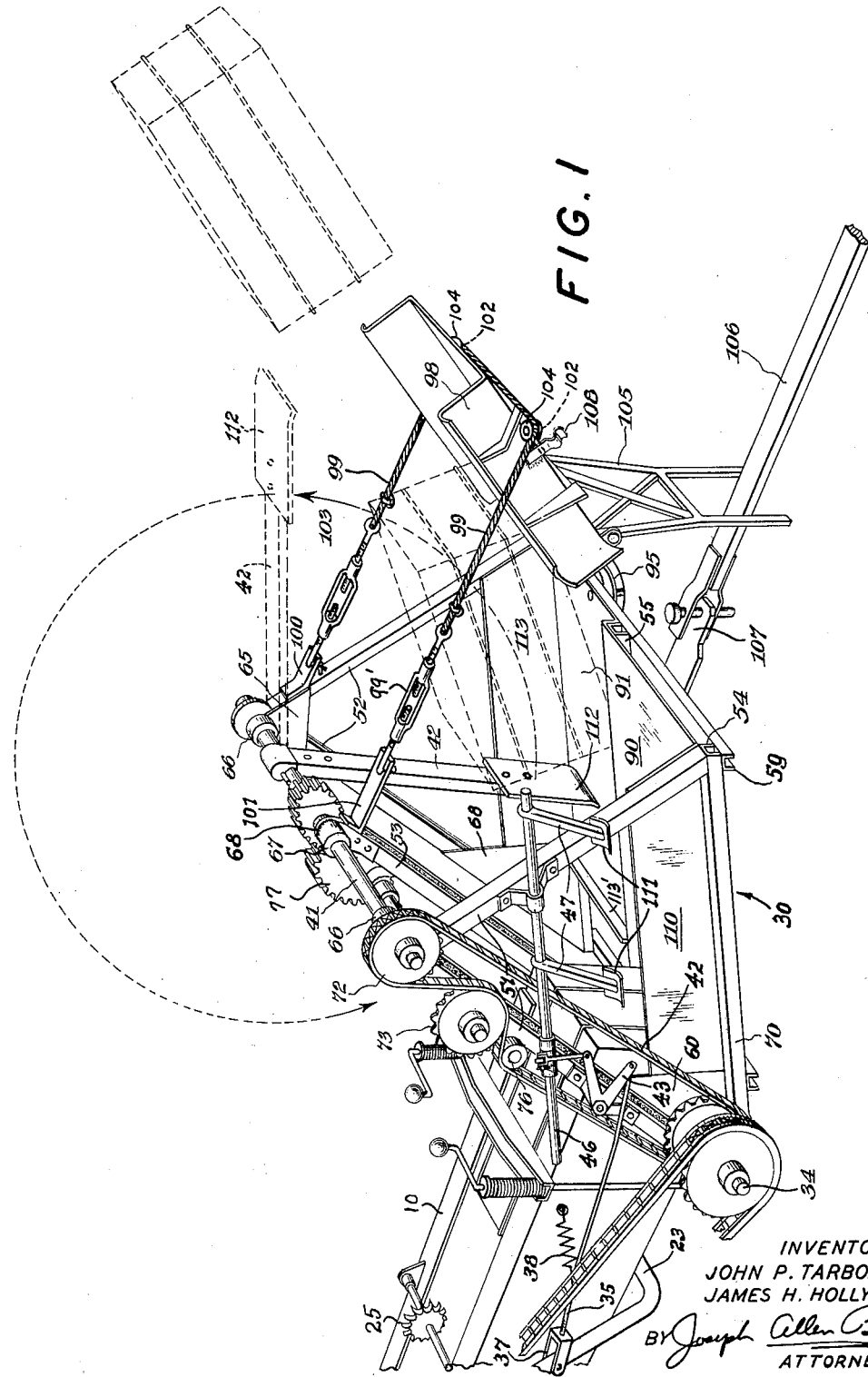
Figure 6:
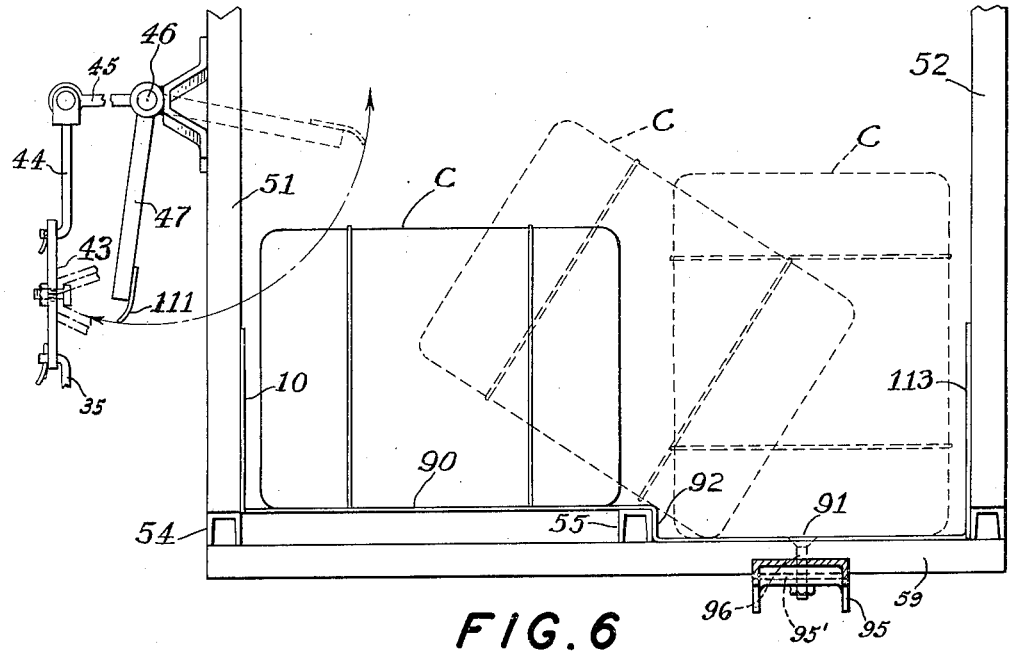
FIG. 6 is a diagrammatic showing of the action of the bale side pushing device.

The preferred position of attachment is that shown most clearly in the perspective of FIG. 1 and in the side elevation of FIG. 2 in which the rear face of the intermediate cross member 58 of the platform frame lies substantially in the plane 83 of the rear end of the bale case while the longitudinal members 54, 55 and 56 extend upwardly at an angle of about 22½ degrees with the plane 84 of the bottom of the bale case. With the framework of the bale handling mechanism 30 at this angle to the bale case its forward end which bears the main drive shaft 34 extends below the rear end of the bale case at the same angle, and there is thus provided ample room for the shaft 34 to be journaled upon the longitudinals 54 and 55 of the frame beneath the bale case. This journaling is by means of bearing-blocks 85 mounted respectively upon the upper faces of longitudinals 54 and 55 as can clearly be seen in FIGS. 2 and 3.

The platform 50 is provided with a floor of sheet metal welded or otherwise secured to the top faces of members 54, 55 and 56 and this floor is comprised of two bale receiving areas, the one 90 emanating directly from the rear end of the bottom of the bale case, and the other 91 lying laterally of the one and being arranged at a distinctly lower level (see FIGS. 1 and 3). Arrangement at the lower level is achieved merely by depressing the transversely extending members 58 and 59 instead of continuing area 91 in the plane of the tops of the longitudinal members 54, 55 and 56. The degree of such depression of the area 91 may be varied and the height of cross section of the members 54, 55 and 56 may be varied to accomplish any degree of such depression which may be desired. Thus there are provided two bale receiving means or areas, the one in line with the bale case adapted to directly receive bales discharged and the other laterally removed therefrom adapted to receive bales which are laterally removed from the position of discharge.

Pivotally connected with the center of the rear end of the laterally disposed hay receiving area 91 by means of a bent tongue 95 and a pivot pin 96 which centers it upon a large diametered trunnion plate 95' is a bale directing channeling chute 97 having side walls 98. Its function is to establish the initial direction or angle of the trajectory of a bale trajected toward and into a following wagon. By virtue of being so pivoted through the tongue member 95, the chute may be swung right and left and thus pre-establish the plane of the trajectory. The upward angle of the chute is adjusted and established by a cable 99 anchored through adjusting turn-buckles 99' at one end to A-frame 52 through bracket 100 and at the other to the intermediate frame member 53 by bracket 101, and supporting the chute in its bight by passing it over rollers 102 bracketed to the underside of the chute.

As shown, an angle of 22½ degrees is suggested as a practical angle between the plane of the bale receiving area 91 and the plane of the bottom of the directing chute 97. While adjustment of the angularity in the vertical plane is manual through turn-buckles as shown, adjustment of the plane of the trajectory is automatic through the provision of an H-frame 105 (FIG. 1), the upper ends of the upper arms of which are bracket pivoted in the transverse plane to the chute 98 while the open lower branches of the H straddle the tongue 106 of a following wagon (not shown) which is being towed through hitch 107 to the rear end of the baler. As the chute is swung right or left as a turn is made the cable 99 passes freely over rollers 102. Being pivoted in the vertical plane the H-frame 105 may be swung upwardly to release it from the straddling of tongue 106 and when swung upwardly may be caught by a spring latch 108 (FIG. 2) and held up while the one loaded wagon moves off and a fresh wagon is brought forward and hitched to the baler. This H-frame 105 will be strong enough of course and so placed as to give positive steering of the chute under all conditions. Too, the effective width of tongue 95 or its equivalent and the effective diameter of trunnion plate 95' or its equivalent will be made of such dimension as effectively to take such unbalanced thrust as the impact of the bale with the chute on a turn may impose upon it. The reaches of cable 99 will be sufficiently spaced apart at all times to avoid interference with the movements of the bales being trajected. Besides these adjustments of vertical and lateral angles of the chute 98, a limited longitudinal adjustment is provided through the placing of a number of holes 109 centrally of the tongue 95 whereby the tongue may be moved a few inches fore-and-aft of the pivot pin 96.

Throughout the mechanism provision is made for all engagements whatsoever of the bale to be handled to be made through contact with broad areas and curvilinear contours in order to avoid disruption of any parts of the bale with consequent loss of leafage or other material. Thus, at the left side of the platform 90 is provided a vertical wall 110 of large area extending from the outside of the left of the bale case forwardly for the full distance between the end of the bale case and the rear member of the A-frame 51. The height of this wall 110 which guides the bale up the bale receiving area 90 is not such as to interfere with the operation of the oscillatable arms 47. Broad terminal engaging plates 111, whose lower ends are of convex cross section relative to the bale side, are provided on the engaging ends of the arms 47 (FIG. 1). A still larger engaging plate 112, whose lower end is of convex cross section toward the bale end, is provided at the engaging end of a bale moving arm 42. These engaging plates 111, 112 may also be of curvilinear cross section transversely if desired. At the right hand side of the laterally disposed bale receiving area 91 is provided a vertical wall 113 of considerable height anchored at opposite ends to the lower portions of the A-frame 52 to constitute a back stop for a bale moved to the area 91 and to guide it smoothly toward chute 97. Finally the side walls 98 of the channel-shaped chute 97 are several inches in height and their upper edges are smoothly outwardly turned, and the walls themselves at the lower end of the chute are outwardly turned or flared, so as to smoothly and surely receive the advancing end of a bale and enter it upon such angular course as the chute imposes.

The operation of the bale handling mechanism in combination with the baler will now be described. First, it is to be noted by reference to FIG. 7 that bale throwing arm 42 has its rotative movements so timed with respect to the movements of the plunger 11 of the baler as to move through its throwing angle (see legend FIG. 2) during the retraction movement of the plunger. This is shown in FIG. 7 by application of the arrows to the respective paths of movement of arm 42 and plunger crank 12. The gear relation between the crank shaft 32 and main drive shaft 34 of the bale trajecting mechanism 30 is such that the plunger 11 makes two strokes while the throwing arm 42 makes but one, but this same gearing insures that arm 42 passes through the angle of the A-frame 52 and just beyond it which is the throwing angle always upon retraction stroke of plunger 11. During the following retraction stroke the arm 42 of course is in an upwardly pointing direction passing through a diametrically opposite angle from that of the A-frame just referred to. Secondly, it is to be noted that elliptical gears 77 (see each of FIGS. 2, 3 and 5) when arm 42 is passing through the throwing angle the lower gear is approaching its maximum radius of drive while the upper is approaching its minimum radius and therefore the arm is being progressively and rapidly accelerated, thus to impart maximum acceleration to the bale being moved approximately at the time that the throwing angle is completed and the throwing arm 42 leaves the bale. Thirdly, it is to be noted that while arm 42 is revolved continuously at one half the rate at which the plunger strokes, the arms 47 which are arranged to engage the side of the bale and move it from area 90 to area 91 are oscillated but once each time the bale tier 22 throws the needle yoke forward to enable the needle 24 to bring the tie around the bale. And fourthly, it will be noted that the length of the bale case between the rear end of a bale being tied and the rear end of the bale case is such that the bale case accommodates approximately two bales at a time, or at least accommodates the bale being tied and the major portion of the precedingly completed bale. This is indicated in dotted lines in FIG. 7 in which the bale ready to be tied is designated bale A and the preceding bale, bale B. This means that a third bale, bale C, is pushed clear of the baler casing by the end of the bale B by the emergence of a minor portion of bale B. This takes place when the bale A is within one or two wads of being completed. The important point in connection with this is that bale C is completely discharged from the casing and free to be handled by the bale trajecting mechanism at the time that the tying mechanism 22 is operating. Finally, it is to be noted that in this baler, as in all plunger operated balers, the tying mechanism is operated to move the needle 24 through the case to bring the tie up during the compression stroke of the plunger, for the plunger is relied upon to compress the final wad which is to enter the bale and to hold it compressed until the needle is through the case and also to protect the needle as it advances. This is conventional and thus not illustrated.

With the foregoing in mind, when needle yoke 23 goes forward to deliver a tying medium to tier 22, arms 47 through their broad convexly faced areas 111 engage the left side of the bale C. They turn it over upon its right side, sweeping it from bale receiving area 90 onto the depressed bale receiving area 91 where it is brought to rest on its side against the broad wall 113 and confined to area 91 by that wall and the step 92 between the areas 91 and 90 of the platform 50. So confined, it is prevented from sliding laterally out of place when the baler is operating upon a hillside slope or when it is being jounced by irregular ground. Since this turning of the bale over upon its side and its shift from bale receiving means 90 to bale receiving means 91 takes place during the latter portion of the compression stroke, arm 42 is not at the time passing through its throwing angle and so does not obstruct the movement of the bale, from area 90 to area 91. The arm 42 occupies other portions of its arc of movement during the latter part of the compression stroke of the plunger. However, upon the immediate retraction stroke or upon the next retraction stroke following, arm 42 enters the angle of A-frame 52, engages the rear end of bale C through its expansive paddle shaped end 112 and trajects the bale under a rapidly accelerating movement to and through directing chute 97 and into a following wagon. The position of the chute is automatically adjusted toward the wagon as the wagon tongue 106 turns. The chute directs the bale to the wagon irrespective of whether the wagon is following directly in the path of the baler or whether it follows at an angle thereto.

Adjustments of the timing of the various parts with respect to each other can readily be achieved by those skilled in the art in the well known manner. This manner consists in slipping the sprocket chains with respect to the sprockets by such number of links as achieves the timing desired. Desiring that the throwing angle of the throwing arm 42 be confined to the retraction stroke of the plunger, one simply has to move the plunger to the extreme of its compression stroke, then adjust the driving sprocket chain of the drive 40 with respect to the sprocket 73 to place the arm 42 at the entrance of its throwing angle or in such proximity thereto as may be found desirable. Inasmuch as a needle yoke 23 commences its advance movement to project the needle 24 through the bale case to effect the tie well before the plunger 11 reaches its most advanced position in the compression stroke, timing of the arms 47 which turn the bale over upon its side is automatically had when it is linked by rod 35 to the yoke 23. Should delayed action be desired, it can be had by altering the lost motion connection afforded by a conventional pin and slot connection at 37 to the yoke 23 to increase its extent. If desired, its action can be supplemented by the addition of the return spring applied as indicated at 38. Through these latter means, should the normal distance of the arms 47 from the side of a bale to be pushed over not be great enough to prevent the arms from reaching the sides of the bale before the bale movement brought about by compression of the last wad of the bale being tied has ceased, sufficient lag can be introduced through alteration of the lost motion connection. On the other hand, the normal position of the arms 47 may be changed to a position more remote from the side of the bale and the arm lengths then appropriately changed in both the bell crank 43 and the crank 45. These latter are mere matters of change of mechanical design. If the engaging rod plates 111 be constituted of convex cross section transversely as well as vertically, engagement just before the movement of the bale has ceased becomes of little moment. The longitudinal position of the arms 47 relative to the center of gravity of the bale is most readily adjusted by simply removing the pin 48 which keys the crank arm 45 to the shaft 46 upon which arms 47 are mounted by passage through one of the series of holes 49 in the shaft. After longitudinally adjusting the shaft to place the arms 47 as desired, the pin is replaced in that one of the holes 49 which is then aligned with the complemental hole in the hub of crank arm 45.

As shown, the angle of platform 50 is fixed at 22½ degrees by the fixed position of the securing brackets 80 and 81 through which the bale trajecting device is attached to the end of the bale case. However, this angle too may be changed, if desired, by simply changing the point of attachment of the brackets to the A-frame 51 and the member 53. On the other hand, as has been pointed out, there are provided turn buckles 99′ in the bracing cable 99 for the purpose of adjusting the angle of the bale chute 97 to make angles with the platform 50 other than the 22½ degree angle shown.

It has also been pointed out that there are provided a series of holes in the tongue 95 by which the bale chute is pivoted to the platform 50 for further adjustment in this angle and the relative position of the entering end of this chute with respect to the bale receiving area 91 of platform 50. The total angle of 45 degrees provided by a sum of the 22½ angles of the platform 50 and the chute 97 affords a very efficient emanation angle of the bale from the chute as it enters upon its trajectory. The utilization of relatively flat bale receiving areas 91 and 90 and the utilization of a bale chute 97 of rectilinear extent enables the parts of the entire supporting structure and chute to be made more economically than would be the case if they were respectively curved to traject at the same 45° angle.

Figure 8:
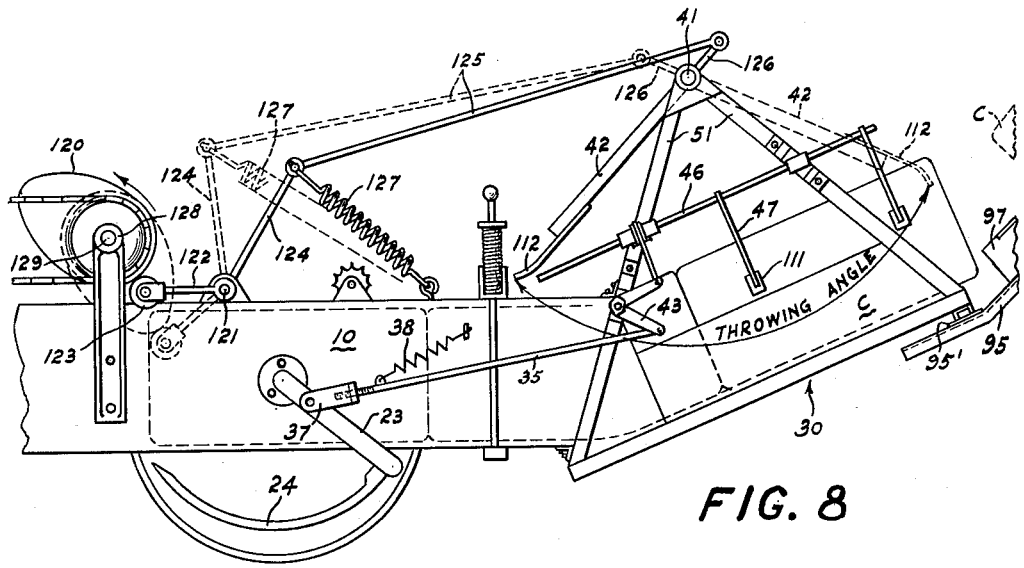
FIG. 8 is a side elevation of a modified form of the trajecting mechanism in somewhat diagrammatic form.
Figure 9:
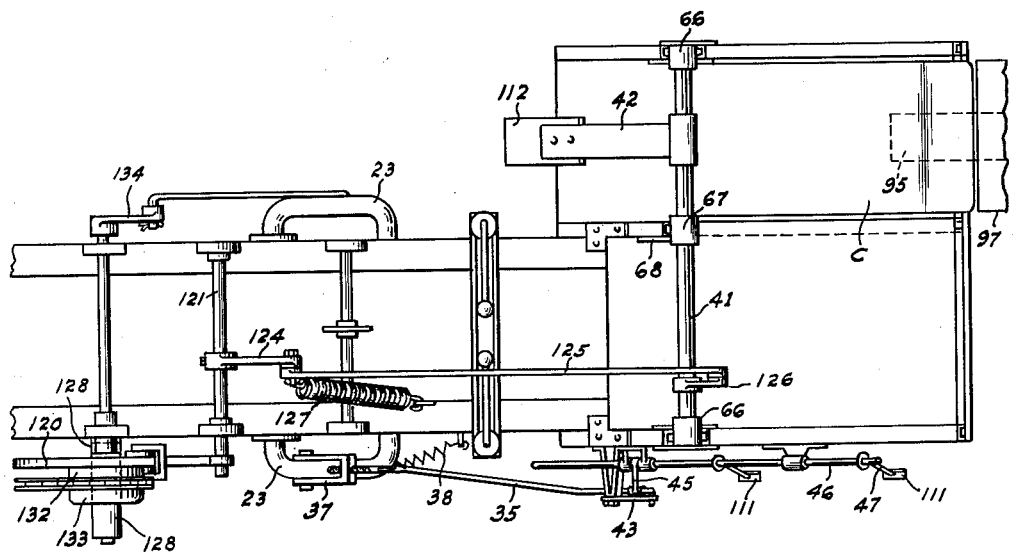
FIG. 9 is a plan view of this form.

The modification the subject of FIGS. 8 and 9 embodies a platform and frame structure and a chute quite the same as that described in the preceding figures. Likewise, the mechanism for displacing the bale laterally by pushing it over upon its side and the means for operating it are the same. Similar parts are similarly numbered. It is the means for trajecting the bale from its displaced position rearwardly into the following wagon, and the means for operating this trajecting means which are different. The arm 42 instead of being arranged to revolve is arranged to oscillate through the throwing angle as indicated in FIG. 8. The means for oscillating it is a cam 120 on the timer shaft 129 of the tier mechanism 22, which acts on the arm 42 through the following linkage system. A countershaft 121 extending across the top of the bale case and mounted thereon in suitable bearings carries at one end a crank arm 122 having a follower 123 which bears upon the cam 120, while a crank arm 124 borne upon countershaft 121 intermediate its ends connects by a link 125 with the upwardly extending crank arm 126 of the shaft 41 which bears the trajecting arm 42. A stout retraction spring 127 connecting the crank arm 124 with the top of the bale case serves not only to retract the trajecting arm 42 but also keep the follower 123 bearing upon the actuating cam 120. An outboard bearing 128 bracketed to the side of the bale case serves to support the outboard end of a timer shaft 129 from undue deflection.

The shape of the cam is such as to impart to the trajecting arm 42 the desired accelerations. Its angular position on the timer shaft 129 of the tier 22 is made such that it drives the arm 42 through the trajecting angle during the retraction stroke of the plunger. Inasmuch as is well known, tiers such as 22 are in timed relationship to the plungers of the balers, this problem of retraction stroke adjustment is similar to that described in connection with the embodiment of the invention shown in FIGS. 1–7. It is to be noted that inasmuch as the cam 120 is attached to the driven member 132 of the clutch of tier 22, as distinguished from the driving member 133, it goes through its cycle in the same period of time that the timer shaft 129 carries the tying mechanism through its cycle. The cycle is a one revolution and stop cycle as is conventional. Moreover, being located on the driving end of the shaft outboard of the bale case and outboard of the tying devices and the needle clutch 34, and provided with outboard bearing 128, the body of the driving shaft 129 of the tier 22 is not subjected to any additional strains or deflections by reason of the load the trajecting mechanism imposes through the operation of cam 120.

The organization of parts as a whole results in considerable simplification with resultant lessened cost of manufacture and lessened cost of maintenance. The lessened cost of maintenance follows by reason of the fact that instead of a constant revolution of an extended driving mechanism culminating in the revolving arm 42, a much simpler mechanism is used, and this mechanism is operated and the arm 42 itself reciprocated but once for each bale which is to be thrown.

That there are possible other modifications of our invention, both major and minor, is immediately suggested by the evolution of the ones set forth. All modifications whatever falling within the generic spirit are intended to be covered in the claims made herein.

Having thus described our invention, what we claim is:

1. In combination with a hay baler having a bale case and a hay compressing plunger operating in said case together with a bale tying mechanism, a first bale receiving means carried by the baler in position to receive bales directly discharged from said case, a second bale receiving means carried by the baler and arranged laterally of the first, in position to receive bales directly from the first receiving means, means operating in timed relationship to the plunger and engaging each bale individually while it occupies said first receiving means to positively move the bale directly from the first receiving means to the second receiving means, and additional means also operating in timed relationship to the plunger, but engaging said bale while it occupies said second named receiving means to move the bale away from the bale case.

2. In a hay baler according to claim 1, wherein said first operating means for shifting the bale out of alignment with the bale case which engages the bale on its side and is possessed of a lateral shifting movement whereby the bale is shifted bodily laterally transversely of its axis, and said additional operating for the further moving of the bale which engages the bale on its end and is possessed of a movement in a longitudinal plane whereby the bale may be trajected longitudinally by such additional moving means.

3. In combination with a hay baler having a bale case and a hay compressing plunger operating in said case together with a bale tying mechanism, bale receiving means carried by the baler in a position to receive a bale in the attitude in which it is discharged from the bale case, a first bale moving means associated with said bale receiving means and operating upon each bale individually while the bale rests on said receiving means and in timed relationship with the tying mechanism to positively change the position of the bale with respect to the bale case, and a bale trajecting means operating upon the bale as it rests in its changed position and in timed relationship to the plunger strokes to traject the bale to a point remote from the bale case.

4. In a hay baler according to claim 3, wherein said first bale moving means is powered through a connection to the bale tying mechanism.

5. In a hay baler according to claim 3 wherein said first bale moving means engages the bale on one side.

6. In a hay baler according to claim 3 wherein said first bale moving means is in the form of an arm oscillatable in a transverse plane.

7. In a hay baler according to claim 3, wherein said first bale moving means engages the bale on one side, means being provided to longitudinally adjust the point of engagement of said means with respect to the center of gravity of the bale.

8. In a hay baler according to claim 3 wherein such trajecting means is in the form of a continuously rotating arm having a plane of rotation laterally of the bale case and intersecting the bale in its changed position.

9. In a hay baler according to claim 3, wherein said trajecting means is driven in timed relation with the baler plunger to engage the bale and traject it to a point remote from the baler during a retraction stroke of the plunger.

10. A bale thrower for hay balers, comprising a platform comprised of first and second longitudinally extending bale receiving members, which platform is attachable to the rear end of a bale case with one of its bale receiving members in line with the bale case and in longitudinal extension thereof while the other is displaced laterally thereof, frame means erected upon the platform and supporting an overhead shaft transversely of the platform, a bale throwing arm revolvable by said shaft in one direction in a plane transecting longitudinally the laterally displaced bale receiving member and engageable with each bale deposited thereon, means also supported from said platform on the side opposite said arm adapted to engage the side of a bale occupying said one receiving member and move it to the other member, and means connected to said transverse shaft to impart thereto and to the arm it carries an acceleration of the movement by which the bale is trajected.

11. A bale thrower according to claim 10 in which an upwardly directed bale directing bale chute is arranged in extension of said laterally disposed area whereby the initial angle of bale trajecting is determined.

References Cited in the file of this patent

UNITED STATES PATENTS

| | | |
|---|---|---|
| 2,625,002 | Prechel | Jan. 13, 1953 |
| 2,756,865 | Morrison et al. | July 31, 1956 |
| 2,785,811 | Forth | Mar. 19, 1957 |
| 2,827,155 | Callum | Mar. 18, 1958 |
| 2,894,651 | Forth et al. | July 14, 1959 |
| 2,956,381 | Chauvin et al. | Oct. 18, 1960 |

FOREIGN PATENTS

| | | |
|---|---|---|
| 106,467 | Sweden | Dec. 3, 1942 |